United States Patent [19]

Piana

[11] Patent Number: 5,739,204

[45] Date of Patent: Apr. 14, 1998

[54] HEAT-CURABLE COATING MATERIAL

[75] Inventor: Hermann Piana, White Plains, N.Y.

[73] Assignee: Degussa Aktiengesellschaft, Frankfurt, Germany

[21] Appl. No.: 614,080

[22] Filed: Mar. 12, 1996

[30] Foreign Application Priority Data

Mar. 14, 1995 [DE] Germany .................. 195 08 669.4

[51] Int. Cl.$^6$ .................................................. C08K 5/05

[52] U.S. Cl. ........................................ 524/539; 524/379

[58] Field of Search ........................... 524/539, 542, 524/379; 525/519; 528/307

[56] References Cited

U.S. PATENT DOCUMENTS

| 3,852,375 | 12/1974 | Biethan et al. | 525/519 |
| 3,980,733 | 9/1976 | Isaken et al. | 525/519 |
| 4,140,729 | 2/1979 | Tobias et al. | 525/519 |
| 4,393,121 | 7/1983 | Tobias et al. | 524/539 |
| 5,003,034 | 3/1991 | Jarzombek et al. | 525/519 |

FOREIGN PATENT DOCUMENTS

| 008344 | 3/1980 | European Pat. Off. . |
| 54-120641 | 9/1979 | Japan . |
| 6-287809 | 10/1994 | Japan . |

*Primary Examiner*—Veronica P. Hoke
*Attorney, Agent, or Firm*—Cushman Darby & Cushman IP Group of Pillsbury Madison & Sutro LLP

[57] ABSTRACT

Heat-curable coating materials having the composition

A) 10–50 wt. % of polyesters consisting of
  a) aromatic and aliphatic and/or cycloaliphatic polycarboxylic acids, having
    aa) 40–90 mol-% are aromatic polycarboxylic acids and
    bb) 60–10 mol-% are aliphatic and/or cycloaliphatic polycarboxylic acids, with
  b) polyols, wherein
    aa) 30–85 mol-% is neopentyl glycol and
    bb) >15–<50 mol-% is 1,3-propanediol;

B) 5–40 wt. % of cross-linking agents

C) 15–50 wt. % of solvents and optionally

D) pigments and

E) conventional paint additives.

7 Claims, No Drawings

HEAT-CURABLE COATING MATERIAL

BACKGROUND OF THE INVENTION

The present invention relates to polyesters for the preparation of heat-curable coating materials. The said polyesters are characterised by the incorporation of repeating units of 1,3-propanediol, in addition to neopentyl glycol and at least one cyclic dicarboxylic acid. The polyesters obtained are constituents of heat-curable coating materials, which preferably contain melamine-formaldehyde resin and catalysts. The coating material can be cured to form a hard but nevertheless flexible layer.

DESCRIPTION OF THE RELATED ART

The use of heat-curable coating materials containing low-molecular polyesters as a protective coating or protective paint for materials such as steel strips is prior art. An ideal protective coating adheres well to the undersurface, is simultaneously hard and flexible, and is resistant to weathering, solvents, abrasion and heat. It is difficult to achieve an optimum for all of these properties, as the improvement of one property is in most cases at the expense of the others. A high elasticity and adhesion are desirable especially during the processing and shaping of already painted metal strips, in order to prevent an exfoliation of the protective coating at the angled parts. At the same time the protective coating should be hard enough to be resistant to mechanical influences.

The hardness can be achieved, for example, by the incorporation of a high proportion of cyclic, in particular aromatic, dicarboxylic acids into the polyester. However, this causes the protective coatings to become brittle and fragile. Another attempt at increasing the hardness involves the use of trihydric or polyhydric alcohols, which result in cross-linked polyesters. This frequently leads to a loss of flexibility in the protective coatings obtained. With cross-linked polyesters, moreover, the problem of an undesirable gelation often arises. When high proportions of cyclic dicarboxylic acids are used, above all terephthalic acid, there is frequently observed the crystallisation or precipitation of the polyester from the solvent, which prevents easy processing of the resins (EP-A 0 397 484).

From EP 0 008 344 liquid coating materials are known which possess a binder having the following composition:

A. 45-5 per cent by weight of aminoplastics and
B. 55-95 per cent by weight of linear polyesters having a molecular weight of from 1500 to 5000 with the polyesters of component B being obtained by condensation of I. butanediol, neopentyl glycol, propanediol and other longer-chain diols with II. aromatic and optionally aliphatic dicarboxylic acids, characterised in that component I is a mixture consisting of I.1 5-30 mole per cent of butanediol-(1,n), wherein n can assume the value 3 or 4, I.2 95-70 mol per cent of neopentyl glycol, which can be substituted, up to 60 mole per cent—referred to neopentyl glycol corresponding to 100 mole per cent—by propanediol-(1,2)

and I.3 0-30 mole per cent of other diols having primary and/or secondary hydroxyl groups, which are separated by a chain of at least 3 C atoms and in that component II is a mixture consisting of II.1 95-70 mole per cent of one or more aromatic dicarboxylic acids, which can be substituted, up to 30 mole per cent—referred to all aromatic dicarboxylic acids corresponding to 100 mole per cent—by cycloaliphatic dicarboxylic acids, and II.2 5-30 mole per cent of one or more dicarboxylic acids.

The coating binders according to EP 0 008 344 hence do contain as component II a mixture of aromatic and aliphatic carboxylic acids, but this measure results at best in an increase in the elasticity of the coating. The hardness of the coatings is still unsatisfactory.

Frequently aliphatic diols such as 1,6-hexanediol or dicarboxylic acids such as adipic acid are used in order to increase the flexibility, but in each case this leads to a decrease in the hardness of the protective coatings (U.S. Pat. No. 4,140,729 and U.S. Pat. No. 4,393,121).

The use of 2-methyl-1,3-propanediol for polyester-melamine storing lacquers which still possess adequate hardness and flexibility was described recently. However, the resistance to weathering is distinctly worse than in conventional polyester coatings (Journal of Coating Technology, 62, page 791 (1990)).

JP-06-287509-A in Derwent Ref. No. 94-363818/45 discloses coating materials based on a polyester containing NPG and 1,3-propanediol, and a cross-linking agent.

SUMMARY OF THE INVENTION

The object of the present invention is to avoid the disadvantages of prior art and to make a coating material, preferably for the coating of metals, the use whereof ensures that the protective coating has good adhesion and flexibility as well as relatively high hardness together with high resistance to weathering, and that the resin is easily workable.

This object is fulfilled according to the invention by a heat-curable coating material, which is suitable preferably for the formation of hard and flexible layers on metal objects and is characterised by a composition comprising A) 10–50 wt. % of one or more polyesters, obtainable by esterification of a mixture of
  a) aromatic and aliphatic and/or cycloaliphatic polycarboxylic acids, wherein of the polycarboxylic acids
   aa) 40–90 mol-% are aromatic polycarboxylic acids and
   bb) 60–10 mol-% are aliphatic and/or cycloaliphatic polycarboxylic acids, on condition that, when dicarboxylic acids are used, at least 50 mol-% of the dicarboxylic acids used are cyclic dicarboxylic acids, with
  b) polyols, wherein of the polyols
   aa) 30–85 mol-% is neopentyl glycol and
   bb) >15–<50 mol-% is 1,3-propanediol, on condition that, when diols are used, at least 30 mol-% of the diols used possess aliphatic side chains, wherein the quantity of components a) and b) must satisfy the following equation $$X = \frac{n1 - n2(F-2)}{n2}$$

wherein
 n1 signifies the number of moles of polyols b),
 n2 signifies the number of moles of polycarboxylic acids a) and
 F signifies the average value of the molar functionality of the polycarboxylic acids and X has a value between 1.05 and 1.5;

B) 5–40 wt. % of polycondensate, partially etherified with monoalcohols, in the form of
  a) melamine-formaldehyde resin having a molar ratio of melamine to formaldehyde of from 1:4.5 to 1:6,
  b) benzoguanamine-formaldehyde resin having a molar ratio of benzoguanamine to formaldehyde of from 1:2.5 to 1:4 and/or
  c) urea-formaldehyde resin having a molar ratio of urea to formaldehyde of from 1:2.5 to 1:6;

C) 15–50 wt. % of organic solvents conventionally used for the preparation of paints;

D) 0–40 wt. % of pigments; and

E) optionally additives, such as are conventionally used for the preparation of paints, in an additional quantity of up to 100 wt. %, referred to 100 wt. % of components A) to D), with the components A) to D) together amounting to 100 wt. % and the polycarboxylic acids a) and likewise the polyols b) being selected so that they each amount to 100 mol-%.

Surprisingly, with the use of this composition, coatings can be obtained which combine the properties of high hardness and high elasticity very well, with a hardness of the order of magnitude according to the invention otherwise being attainable only in combination with "hard" diols such as ethylene glycol and an elasticity of this degree being attainable only in combination with "soft" diols such as hexanediol.

In this connection, within the scope of the invention 1,3-propanediol is not used as a substitute for 1,2-propanediol, but on the contrary instead of 1,4-butanediol. In particular 1,3-propanediol combines in a favourable manner the properties of hardness and softness, which results in the outstanding range of properties of the coating material under consideration.

The polyesters used according to the invention as component A) are prepared from polycarboxylic acids a) and polyols b). Here the term polycarboxylic acids or polyols also includes dicarboxylic acids or diols respectively, and hence compounds possessing two or more of the corresponding functional groups.

Suitable aromatic polycarboxylic acids aa) include phthalic acid, isophthalic acid, terephthalic acid, trimellitic acid, naphthalenedicarboxylic acids, diphenyldicarboxylic acids, phthalic acids possessing substituted alkyl groups or halogen atoms, as well as mixtures thereof.

The aliphatic and/or cycloaliphatic polycarboxylic acids bb) which can be used according to the invention include succinic acid, adipic acid, glutaric acid, pimelic acid, suberic acid, azelaic acid, sebacic acid, hexahydrophthalic acid, cyclohexyldicarboxylic acids, tetrahydrophthalic acids, as well as mixtures of the above-mentioned substances.

Within the scope of the invention, aromatic polycarboxylic acids are used in a definite proportion to aliphatic and/or cycloaliphatic polycarboxylic acids, while the condition is to be fulfilled that, in the event of dicarboxylic acids being used as component aa) or bb), at least 50 mol-% of the dicarboxylic acids used be cyclic dicarboxylic acids. In this connection the cyclic dicarboxylic acids may belong to the group aa) comprising the aromatic polycarboxylic acids as well as to the group bb) comprising the aliphatic and/or cycloaliphatic polycarboxylic acids, with obviously only the cycloaliphatic representatives being suitable in the latter case of the group bb). Instead of the acids, the corresponding anhydrides may also be used, provided their formation is possible.

Preferred compounds of component A) according to the invention are, from the group aa), isophthalic acid and phthalic anhydride and, from the group bb), adipic acid.

The polyols b), with which the polycarboxylic acids a) are reacted in order to obtain component A), include two essential compounds, which are used in a proportion carefully coordinated with the product quality aimed for.

An essential constituent in this connection is aa) 30–85 mol-% of neopentyl glycol mixed with the second essential polyol constituent, namely, 1,3-propanediol, which is used in a quantity of > 15 to < 50 mol-%, referred to 100 mol-% of polyols. The stated quantities are crucial and it has been found that they must be adhered to if the invention is to be put into effect.

Polyols which can be used besides neopentyl glycol and 1,3-propanediol are diols such as ethylene glycol, 1,2-propylene glycol, 1,4-butanediol, 1,6-hexanediol, 1,3-butanediol, bis(hydroxymethyl)cyclohexane or cyclohexanediol. Besides these, glycerol, trimethylolpropane, trimethylolethane, 1,2,6-hexanetriol or similar compounds are used as triols.

In this connection, in a preferred embodiment triols are contained in the polyol component b) in a quantity of up to 50 mol-%, referred to the total quantity of polyols.

According to the invention, the quantity of components a) and b) are to satisfy the following equation $$X = \frac{n1 - n2(F - 2)}{n2} \,.$$

From this it follows, for example, in the event that the acids used all have a functionality of 2, that F equals 2, n2 (F-2) equals 0 and the ratio of n1:n2 must therefore be in the range between 1.05 and 1.5. If the ratio of the components a) and b) is outside the range of values given by X, the heat-curable coating materials no longer possess the properties illustrated in the Examples according to the invention.

In a further useful development of the invention, the heat-curable coating material is characterised in that up to 40 mol-% of polyols b) have at least 4 or more carbon atoms.

In all cases, when diols are used the proportion of diols having aliphatic side chains is to be at least 30 mol-%, referred to the total quantity of diols used.

The polyesters of this invention preferably contain a high proportion of cyclic compounds, in particular cyclic dicarboxylic acids, and are nevertheless easily workable, without crystallisation during preparation. The polyesters obtained can therefore be stored at relatively low temperatures over a prolonged period of time, without becoming solid or crystallising out of solution.

To prepare the polyesters, any method of condensation suitable for the purpose and familiar to the person skilled in the art can be used. The polyesters can, for example, be prepared by direct esterification of polycarboxylic acids or polycarboxylic acid anhydrides with aliphatic polyols, by the reaction of polycarboxylic acid chlorides with aliphatic polyols or by the reaction of the corresponding esters with aliphatic polyols. However, direct esterification is the preferred method.

In a preferred variant, the method for the preparation of the polyester component A) is characterised in that a mixture of the starting components is heated with stirring and the liberated water is distilled off, with distillation being continued until an acid number (according to DIN) of < 20 is attained, and the polyester obtained is diluted with organic solvents until a polyester solution having an OH number of > 30, preferably > 35, is present.

Known per se cross-linking agents containing N-methylol groups such as aminoplastics (these are reaction products of formaldehyde with, for example, urea, dicyandiamide, aminotriazines), for example melamine and benzoguanamine, in partly or completely etherified form can be used as component B). The etherification can have been carried out using aliphatic alcohols having up to 4 C atoms.

Amino resins partly etherified with monoalcohols, the resins being polycondensates of melamine, benzoguanamine and/or urea respectively with formaldehyde, are particularly preferably used as component B). Preferred alcohols for the etherification are methanol, ethanol, n-propanol, isopropanol, butanol and homologous monoalcohols.

The solvents C) used for dissolving the coating materials include, for example, aromatic solvents such as toluene, xylene, aromatic petroleum fractions such as Solvesso 100, Solvesso 150, also ketones such as methyl isobutyl ketone, isophorone, ethyl amyl ketone, methyl amyl ketone, alcohols such as n-butanol, amyl alcohol, 2-ethylhexanol and cyclohexanol, ethers or esters such as acetate ester, methoxyethanol ethoxyethanol, butoxyethanol, hexoxyethanol, methoxypropanol, methoxyethyl acetate, ethoxyethyl acetate, but preferably a mixture of two or more of the above-mentioned solvents.

Besides the preferred pigment titanium dioxide, other pigments such as zinc oxides, iron oxides, bentonite, silicates, chromium pigments, carbon black pigment et cetera can be used as component D) in order to obtain an opaque or pigmented film of the required covering power.

The additives E) used are, for example, flow-control agents, antisettling agents, antioxidants, UV stabilisers, agents for promoting thixotropy, rust inhibitors, plasticisers, gloss improvers, wetting agents, waxes and catalysts, which contribute to the attainment of high-quality covering layers.

The coating materials are prepared by various methods including the method of preparation explained, for example, in Examples 1–11. The application can be carried out by the methods common in coating technology such as rolling, spraying, brushing, marbling or dipping.

Suitable undersurfaces are primarily pretreated or raw metallic substrates such as iron or steel, galvanised iron or galvanised steel, aluminium or other sheet metals. The heat-curable polyester coatings described find application in industrial coatings, primarily in the field of coil coating, can coating and automobile enamelling.

The coating materials according to the invention possess good elasticity, good adhesion in the resulting coatings, high gloss and good resistance to weathering, and all the constituents thereof are compatible.

DESCRIPTION OF THE PREFERRED EMBODIMENTS

In a particularly preferred embodiment, a coating material according to the invention is characterised in that it has an Erichsen cupping index≧5 mm and/or a pendulum hardness (by König's method) > 150.

The following Examples illustrate the invention contrasted with Comparative Examples not according to the invention.

EXAMPLE A1

996.3 g of isophthalic acid, 142.2 g of adipic acid, 103.5 g of 1,3-propanediol and 691.6 g of neopentyl glycol together with 0.71 g of Fascat 4100 are weighed into a four-necked flask equipped with stirrer, diluting vessel, electric resistance heating, thermocouple and reflux condenser having an overhead thermometer fitted thereto plus distillation bridge and receiver. After saturation with nitrogen, the mixture is heated to 120° C. The mixture, which is stirrable at this temperature, is then further heated with stirring to 190° C., with the liberated water being distilled off. In the course of this, the reflux condenser is maintained at 120° to 125° C. in order to prevent the other constituents from being distilled off. Over a period of 6.5 h the temperature is elevated to 210° C., with the temperature of the top of the column not exceeding 103° C. A light vacuum is applied and the mixture is further esterified until an acid number (according to DIN) of < 20 is attained. The mixture is then cooled to 120° C. and the polyester is diluted with a 1:1 mixture of Shellsol A and butylene glycol until a 60% solution of the polyester having an OH number of 63, referred to the solid polyester, is present.

EXAMPLES A2 TO A4

Polyesters are prepared as in Example 1, but with the proportion of diol being varied. Quantities used, reaction time and OH numbers are given in Table 1.

EXAMPLE A7

165 g of neopentyl glycol, 81.8 g of trimethylolpropane, 108.4 g of phthalic anhydride, 121.5 g of isophthalic acid, 122.5 g of adipic acid, 55.7 g of 1,3-propanediol, 15 g of xylene and 1 g of dibutyltin dioxide are weighed into the apparatus described in A1. After saturation with nitrogen, the mixture is heated to 160° C., with the mixture being stirrable from 100° C. From 160° C. first of all xylene with water, and then water, are distilled off. Over a period of 5 h the temperature is elevated to 220° C. When an acid number of < 20 has been attained, the polyester is cooled to 140° C. and diluted with a 1:1 mixture of xylene/2-ethoxyethyl acetate, until a 60% solution of the polyester has formed.

EXAMPLE A8

A polyester is prepared as described in A7. Quantities used, as well as reaction time and OH number of the polyester formed are given in Table 2.

COMPARATIVE EXAMPLES A9 TO A11

The polyesters described in the Comparative Examples A9 to A11 are prepared in a manner similar to the polyester described in A1. However, in this case 1,3-propanediol was substituted by other diols. Quantities used, reaction time as well as acid numbers and OH numbers of the polyesters are given in Table 1.

COMPARATIVE EXAMPLE A12

A polyester is prepared as described in A1, but with 100% of NPG being used as the diol component (cf. Table 1). However the polyester, dissolved to the extent of 60% in Shellsol AB and butylene glycol 1:1, already crystallises out in the warm at 30° C., so that it is not suitable for the preparation of a paint.

FORMULATION EXAMPLE B1

200 g of Titanox 2190, 0.8 g of Bentone 38, 173.6 g of the 60% polyester from Example A1, 16 g of ethylene glycol and 160 g of Shellsol AB are abraded in a ball mill until a homogeneous paste is formed. 68.8 g of this paste is dispersed with 1 g of isobutanol, 1 g of Modaflow, 20 g of the 60% polyester from Example A1, 6.3 g of Cymel 303, 4.0 g of 2-ethoxyethyl acetate and 0.5 g of Nacure X 49 LD. The stoving lacquer obtained has a discharge velocity of 30 sec (DIN beaker, 4 mm). The composition of the coating materials in parts by weight is given in Table 3.

FORMULATION EXAMPLES B2 TO B4, B7 AND B8

A coating material is formulated as in Example B1, with each of the polyesters in Examples A2 to A4 and A7 and A8 respectively now being used instead of the polyester in A1. The proportions used are given in Table 3.

FORMULATION EXAMPLES B5 AND B6

The formulations are prepared as in B1, but altering the make-up of the proportions of polyester to melamine resin. The proportions used are given in Table 3.

COMPARATIVE FORMULATIONS B9 TO B11

The comparative formulations B9 to B11 are prepared corresponding to the directions in B1, but using the polyesters as in A9 to A11. The proportions used are again given in Table 3.

PREPARATION OF THE COATINGS C1 TO C11

To prepare the coatings, the coating materials formulated according to B1 to B11 are applied (wet film thickness 125–150 μm) to metal sheets passivated by treatment with iron phosphate (Bonder 2660 OC, firm Chemetall GmbH) and ventilated for 5 min. The coating materials are then stored at 160° C. for 10 min. The results determined for the coating properties are given in Table 4. The cured coatings designated C1 to C11 correspond respectively to the formulations B1 to B11.

Determination of the coating properties

A Pendulum hardness by König's method in accordance with DIN 53 157

B Dry film thickness in accordance with DIN 50 981 or ISO 2178

C Erichsen cupping index in accordance with DIN ISO 1520

D Cross cutting in accordance with DIN 53 151

E Gloss testing in accordance with DIN 67 530 (Dr. Lange reflectometer type LMG 064)

F Accelerated weathering using QUV Accelerated Weathering Tester. Lamp: UVA, cycle: 6 h.

Dry radiation (55° C.) and 6 h moistening without UV radiation (40° C., 100% atmospheric moisture)

Further meanings

Cymel 303=hexa(methoxymethyl)melamine

Nacure X 49 LD=amine-blocked dinonylnaphthalenedisulphonic acid 38% in isopropanol/i-butanol/water Rx time=reaction time in hours TMP=1,1,1-trimethylolpropane

TABLE 1

| | \multicolumn{8}{c}{Polyester example} | | | | | | | |
|---|---|---|---|---|---|---|---|---|
| | A1 | A2 | A3 | A4 | A9 | A10 | A11 | A12 |
| Isophthalic acid [g] | 996.3 | 996.3 | 996.3 | 996.3 | 497.1 | 498.4 | 497.3 | 443.2 |
| Adipic acid [g] | 142.2 | 142.2 | 142.2 | 142.2 | 70.9 | 71.0 | 70.9 | 63.2 |
| Neopentyl glycol [g] | 691.6 | 626.4 | 564.2 | 416.7 | 312.5 | 312.4 | 312.5 | 370.8 |
| Type of diol | 1,3-PD | 1,3-PD | 1,3-PD | 1,3-PD | EG | 1,2-PD | 1,6-HD | — |
| Quantity [g] | 103.5 | 152.6 | 197.9 | 305.1 | 62.1 | 76.0 | 118.2 | |
| Fascat 4100 [g] | 0.71 | 0.71 | 0.71 | 0.68 | 0.35 | 0.35 | 0.37 | 0.132 |
| Rx time [h] | 6 | 5.5 | 4.5 | 5 | 6 | 6 | 4.75 | 6 |
| Acid number | 7 | 20 | 6 | 9 | 20 | 16 | 9 | 18 |
| OH number | 63 | 36 | 62 | 38 | 45 | | | |
| Molar ratio NPG:diol | 83:17 | 75:25 | 67.5–32.5 | 50:50 | 72:25 | 75:25 | 75:25 | 100:0 |

1,2-PD = 1,2-propanediol
1,3-PD = 1,3-propanediol
EG = Ethylene glycol
1,6-HD = 1,6-hexanediol
NPG:diol = Neopentyl glycol/diol ratio

TABLE II

| Polyester example | A7 | A8 |
|---|---|---|
| Isophthalic acid [g] | 121.5 | 121.5 |
| Adipic acid [g] | 122.5 | 122.5 |
| Phthalic anhydride [g] | 108.4 | 108.4 |
| NPG [g] | 165.0 | 76.1 |
| TMP [g] | 81.8 | 81.8 |
| Diol | 1,3-PD | 1,3-PD |
| Quantity [g] | 55.7 | 120.5 |
| Xylene [g] | 15 | 15 |
| Dibutyltin oxide [g] | 1 | 1 |
| Rx time | 5 | 5 |
| Acid number | 13 | 15 |

NPG = Neopentyl glycol
TMP = Trimethylolpropane

TABLE III (Data in parts by weight)

| | \multicolumn{11}{c}{Formulation} | | | | | | | | | | |
|---|---|---|---|---|---|---|---|---|---|---|---|
| | B1 | B2 | B3 | B4 | B5 | B6 | B7 | B8 | B9 | B10 | B11 |
| | \multicolumn{11}{c}{Polyester} | | | | | | | | | | |
| | A1 | A2 | A3 | A4 | A5 | A6 | A7 | A8 | A9 | A10 | A11 |
| (60% in butylene glycol Shellsol AB) | 217 | 217 | 217 | 217 | 217 | 217 | 217 | 217 | 217 | 217 | 217 |
| Titanium dioxide 2190 | 250 | 250 | 250 | 250 | 250 | 250 | 250 | 250 | 250 | 250 | 250 |
| Ethylene glycol | 20 | 20 | 20 | 20 | 20 | 20 | 20 | 20 | 20 | 20 | 20 |
| Shellsol AB | 200 | 200 | 200 | 200 | 200 | 200 | 200 | 200 | 200 | 200 | 200 |
| Bentone 38 | 1 | 1 | 1 | 1 | 1 | 1 | 1 | 1 | 1 | 1 | 1 |

TABLE III-continued (Data in parts by weight)

| | \multicolumn{11}{c}{Formulation} |
|---|---|---|---|---|---|---|---|---|---|---|---|
| | B1 | B2 | B3 | B4 | B5 | B6 | B7 | B8 | B9 | B10 | B11 |
| | \multicolumn{11}{c}{Polyester} |
| | A1 | A2 | A3 | A4 | A5 | A6 | A7 | A8 | A9 | A10 | A11 |
| Isobutanol | 10 | 10 | 10 | 10 | 10 | 10 | 10 | 10 | 10 | 10 | 10 |
| Modaflow | 10 | 10 | 10 | 10 | 10 | 10 | 10 | 10 | 10 | 10 | 10 |
| PES, 60% | A2 | A2 | A2 | A4 | A2 | A2 | A7 | A8 | A9 | A10 | A11 |
| Quantity | 200 | 200 | 200 | 201 | 200 | 200 | 200 | 200 | 204 | 200 | 200 |
| Cymel 303 | 64 | 64 | 64 | 64 | 42 | 83 | 64 | 64 | 64 | 64 | 65 |
| 2-Ethoxyethyl acetate | 40 | 40 | 40 | 40 | 40 | 40 | 40 | 40 | 40 | 40 | 40 |
| Nacure X 49 LD | 5 | 5 | 5 | 5 | 5 | 5 | 5 | 5 | 5 | 5 | 5 |
| Total | 1017 | 1017 | 1017 | 1018 | 996 | 1037 | 1017 | 1017 | 1021 | 1017 | 1018 |
| Discharge time (DIN beaker, 4 mm) | 55 | 30 | 26 | 23 | 35 | 30 | 15 | 15 | 22 | 21 | 40 |

TABLE 4

| | \multicolumn{11}{c}{Cured Coatings} |
|---|---|---|---|---|---|---|---|---|---|---|---|
| | C1 | C2 | C3 | C4 | C5 | C6 | C7 | C8 | C9 | C10 | C11 |
| | \multicolumn{11}{c}{Formulation} |
| | B1 | B2 | B3 | B4 | B5 | B6 | B7 | B8 | B9 | B10 | B11 |
| Dry film thickness (μm) | 41 | 38 | 42 | 38 | 38 | 37 | 39 | 33 | 35 | 40 | 39 |
| Pendulum hardness (König) | 170 | 160 | 165 | 125 | 150 | 140 | 155 | 125 | 165 | 150 | 120 |
| Erichsen cupping index (mm) | 7.6 | 6.8 | 7.9 | 8.2 | 6.3 | 7.2 | 5.3 | 6.4 | 3.5 | 1.8 | 8.1 |
| Cross cutting (mm) | 0 | 0 | 0 | 0 | 0 | 0 | 0–1 | 0–1 | 0 | 0 | 0 |
| Gloss | | | | | | | | | | | |
| 20° | 34 | 41 | 48 | 41 | 25 | 27 | 20 | 22 | 34 | 11 | 48 |
| 60° | 80 | 84 | 85 | 83 | 77 | 76 | 69 | 71 | 80 | 51 | 85 |
| 80° | 87 | 92 | 94 | 92 | 85 | 85 | 86 | 89 | 88 | 67 | 94 |
| Accelerated weathering Gloss at 60° C. | | | | | | | | | | | |
| 0 value | | 84 | | 83 | | | | | 80 | | 86 |
| 500 h | | 84 | | 67 | | | | | 74 | | 85 |
| 1000 h | | 81 | | 65 | | | | | 70 | | 80 |
| 1500 h | | 79 | | 60 | | | | | 68 | | 68 |
| 2000 h | | 76 | | 48 | | | | | 58 | | 59 |

I claim:

1. Heat-curable coating composition comprising
A) 10–50 wt. % of one or more polyesters, obtained by esterification of a mixture of
   a) aromatic and aliphatic and/or cycloaliphatic polycarboxylic acids, wherein of the polycarboxylic acids
      aa) 40–90 mol-% are aromatic polycarboxylic acids and
      bb) 60–10 mol-% are aliphatic and/or cycloaliphatic polycarboxylic acids,
      on condition that, when dicarboxylic acids are used, at least 50 mol-% of the dicarboxylic acids used are cyclic dicarboxylic acids, with
   b) polyols, wherein of the polyols
      aa) 30–85 mol-% is neopentyl glycol and
      bb) > 15-< 40 mol-% is 1,3-propanediol, on condition that, when diols are used, at least 30 mol-% of the diols used possess aliphatic side chains,
wherein the quantity of components a) and b) must satisfy the following equation $$X = \frac{n1 - n2(F - 2)}{n2}$$

wherein
n1 signifies the number of moles of polyols b),
n2 signifies the number of moles of polycarboxylic acids a) and
F signifies the average value of the molar functionality of the polycarboxylic acids and
X has a value between 1.05 and 1.5;
B) 5–40 wt. % of polycondensate, partially etherified with monoalcohols, in the form of
   a) melamine-formaldehyde resin having a molar ratio of melamine to formaldehyde of from 1:4.5 to 1:6,
   b) benzoguanamine-formaldehyde resin having a molar ratio of benzoguanamine to formaldehyde of from 1:2.5 to 1:4 and/or
   c) urea=formaldehyde resin having a molar ratio of urea to formaldehyde of from 1:2.5 to 1:6;
C) 15–50 wt. % of organic solvents suitable for the preparation of paints; and D) 0–40 wt. % of pigments; and E) conventional paint additives for improving paint quality, in a quantity of 0 to 100 wt. % referred to 100 wt. % of components A) to D).

2. Heat-curable coating composition according to claim 1, wherein up to 50 mol-% of the polyols b) are triols.

3. Heat-curable coating composition according to claim 1 or 2, wherein up to 40 mol-% of the polyols b) have at least 4 or more carbon atoms.

4. Heat-curable coating composition according to claims 1 or 2, characterized by an Erichsen cupping index $\geq 5$ mm and/or a pendulum hardness (by Konig's method) > 150.

5. The heat curable coating composition of claims 1 or 2 wherein the A) polyester is prepared by heating a mixture of the starting components while stirring to form the polyester and liberated water and distilling off the liberated water until an acid number of < 20 is attained, and diluting the polyester with organic solvents until a polyester solution having an OH number of > 30 is present.

6. Heat curable coating composition according to claim 1 wherein the polyester solution has an OH number > 35.

7. In a coil coating paint composition wherein the improvement comprises the composition of 1.

* * * * *